United States Patent
Gorai

(10) Patent No.: US 8,504,282 B2
(45) Date of Patent: Aug. 6, 2013

(54) VEHICLE

(75) Inventor: Naoki Gorai, Tokyo (JP)

(73) Assignee: Equos Research Co., Ltd., Tokyo (JP)

( * ) Notice: Subject to any disclaimer, the term of this patent is extended or adjusted under 35 U.S.C. 154(b) by 508 days.

(21) Appl. No.: 12/682,736

(22) PCT Filed: Oct. 1, 2008

(86) PCT No.: PCT/JP2008/067789
§ 371 (c)(1),
(2), (4) Date: Jun. 6, 2010

(87) PCT Pub. No.: WO2009/048004
PCT Pub. Date: Apr. 16, 2009

(65) Prior Publication Data
US 2010/0280745 A1    Nov. 4, 2010

(30) Foreign Application Priority Data
Oct. 12, 2007   (JP) .................................. 2007-266010

(51) Int. Cl.
*B60K 8/00*   (2006.01)
*B62D 57/00*  (2006.01)
*B62D 61/00*  (2006.01)
*B62D 63/00*  (2006.01)
*B62D 37/04*  (2006.01)

(52) U.S. Cl.
USPC ............ 701/124; 180/7.1; 180/218; 180/282; 180/54.1

(58) Field of Classification Search
USPC .................................................. 701/22, 124
See application file for complete search history.

(56) References Cited

U.S. PATENT DOCUMENTS

| 6,934,610 B2 * | 8/2005 | Wakashiro et al. ............. 701/22 |
| 7,344,687 B2 * | 3/2008 | Oi et al. ......................... 422/198 |
| 8,155,828 B2 * | 4/2012 | Fuwa et al. ..................... 701/36 |
| 2005/0143876 A1 * | 6/2005 | Tanase ............................. 701/22 |
| 2006/0155435 A1 * | 7/2006 | Dell et al. ........................ 701/22 |

FOREIGN PATENT DOCUMENTS

| JP | 4-15713 A | * | 1/1992 |
| JP | A-04-015713 | | 1/1992 |
| JP | A-09-130909 | * | 5/1997 |
| JP | A-11-143540 | | 5/1999 |

(Continued)

OTHER PUBLICATIONS

International Search Report issued in International Application No. PCT/JP2008/067789 on Nov. 11, 2008 (with English-language translation).

(Continued)

*Primary Examiner* — Fadey Jabr
*Assistant Examiner* — Charles J Han
(74) *Attorney, Agent, or Firm* — Oliff & Berridge, PLC

(57) ABSTRACT

When a vehicle is stopped on a slope, a brake is operated to stop rotation of a drive wheel so that no torque is applied thereto, and the posture of the body is controlled by moving an active weight portion so that stabilized stop state of the vehicle can be achieved without consuming a large quantity of energy. The vehicle comprises the drive wheel attached rotatably to the body, the active weight portion attached movably to the body, and a vehicle controller for controlling the posture of the body by controlling at least one of the drive torque imparted to the drive wheel and the position of the active weight portion, wherein the vehicle controller controls the posture of the body by controlling only the position of the active weight portion when the vehicle is stopped on a slope.

6 Claims, 11 Drawing Sheets

FOREIGN PATENT DOCUMENTS

| | | |
|---|---|---|
| JP | A-2004-129435 | 4/2004 |
| JP | A-2004-345030 | 12/2004 |
| JP | A-2007-203965 | 8/2007 |
| WO | WO 2006/095823 A1 | 9/2006 |
| WO | WO 2007/088944 * | 8/2007 |

OTHER PUBLICATIONS

May 11, 2010 International Preliminary Report on Patentability issued in PCT/JP2008/067789 with translation of Written Opinion of the International Searching Authority.

* cited by examiner

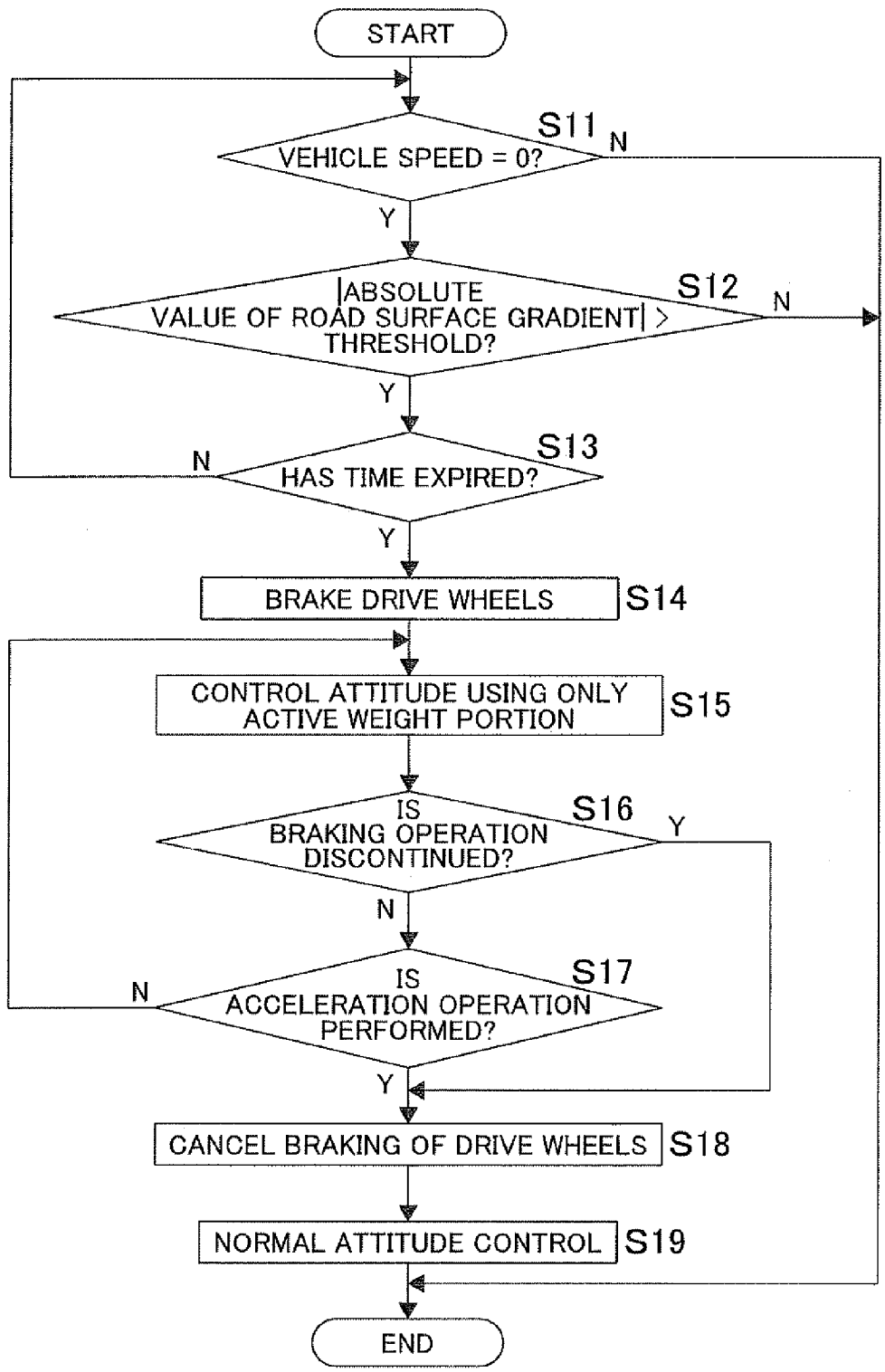

VEHICLE

TECHNICAL FIELD

The present invention relates to a vehicle that utilizes inverted-pendulum attitude control.

BACKGROUND ART

Vehicles that utilize inverted-pendulum attitude control are proposed in the related art. For example, there are proposed a vehicle that includes two drive wheels disposed on the same axis and that is driven while sensing changes in attitude of a vehicle body caused by an operator by moving his/her center of gravity and a vehicle that includes a single spherical drive wheel and that moves while controlling the attitude of a vehicle body (see Patent Document 1, for example).

These vehicles are moved and stopped by detecting the balance of the vehicle body and the operating state using sensors and controlling the operation of rotating bodies.

Patent Document 1: Japanese Patent Application Publication No. JP-A-2004-129435

DISCLOSURE OF THE INVENTION

Problem to be Solved by the Invention

However, the vehicles according to the related art cannot remain stably stationary on a slope. For example, in order to keep a vehicle stationary on a slope, it is necessary to apply a drive torque to the drive wheels so that the vehicle does not move in the downslope direction. Applying a drive torque to the drive wheels requires a large amount of energy. Therefore, a large amount of energy is consumed even though the vehicle is stationary, which lowers the energy efficiency.

Moreover, causing drive motors to continuously generate a large torque with the drive wheels stationary on a steep slope results in overuse of a part of a drive circuit in the drive motors, which may deteriorate or damage elements in the drive circuit.

In order to address the issues of the vehicles according to the related art, it is an object of the present invention to provide a high-utility vehicle that can remain stably stationary on a slope without consuming a large amount of energy by controlling the attitude of a vehicle body by moving an active weight portion with no torque is applied to a drive wheel by actuating a braking device to stop rotation of the drive wheel.

Means for Solving the Problem

To this end, a vehicle according to the present invention includes: a drive wheel rotatably attached to a vehicle body; an active weight portion attached so as to be movable with respect to the vehicle body; and a vehicle control device that controls an attitude of the vehicle body by controlling at least one of a drive torque applied to the drive wheel and a position of the active weight portion, in which the vehicle control device controls the attitude of the vehicle body by controlling only the position of the active weight portion when the vehicle is stationary on a slope.

In another vehicle according to the present invention, the vehicle further includes a road surface gradient estimation means for estimating a road surface gradient of the slope, and the vehicle control device controls the attitude of the vehicle body by controlling only the position of the active weight portion when the vehicle is stationary on the slope with the road surface gradient, estimated by the road surface gradient estimation means, that has an absolute value larger than a predetermined threshold.

In a further another vehicle according to the present invention, the vehicle further includes a timer that counts time, and the vehicle control device controls the attitude of the vehicle body by controlling only the position of the active weight portion when the timer counts a predetermined time or more with the vehicle stationary.

In a further another vehicle according to the present invention, in addition, the vehicle control device controls the attitude of the vehicle body by controlling the drive torque applied to the drive wheel and the position of the active weight portion when a braking operation is discontinued or an acceleration operation is performed.

In a further another vehicle according to the present invention, the vehicle further includes a braking device that brakes the drive wheel, and the vehicle control device actuates the braking device to brake the drive wheel when the vehicle is stationary.

In a further another vehicle according to the present invention, in addition, the vehicle control device cancels braking of the drive wheel performed by the braking device when a braking operation is discontinued or an acceleration operation is performed.

A still another vehicle according to the present invention includes: a drive wheel rotatably attached to a vehicle body; an active weight portion attached so as to be movable with respect to the vehicle body; and a vehicle control device that controls an attitude of the vehicle body by controlling a position of the active weight portion when the vehicle is stationary on a slope.

Effects of the Invention

According to the above configuration, it is possible to keep the vehicle stably stationary without consuming a large amount of energy with no need to apply a torque to a drive wheel.

According to the above configuration, it is possible to keep the vehicle stably stationary even on a slope by keeping appropriate balance of a vehicle body.

According to the above configuration, it is possible to immediately drive off the vehicle in response to an operation performed by a passenger.

BRIEF DESCRIPTION OF THE DRAWINGS

FIG. 13 is a flowchart showing the procedures of a slope stopping process for the vehicle according to the second embodiment of the present invention.

BEST MODES FOR CARRYING OUT THE INVENTION

Embodiments of the present invention will be described in detail below with reference to the drawings.

Figure 1:
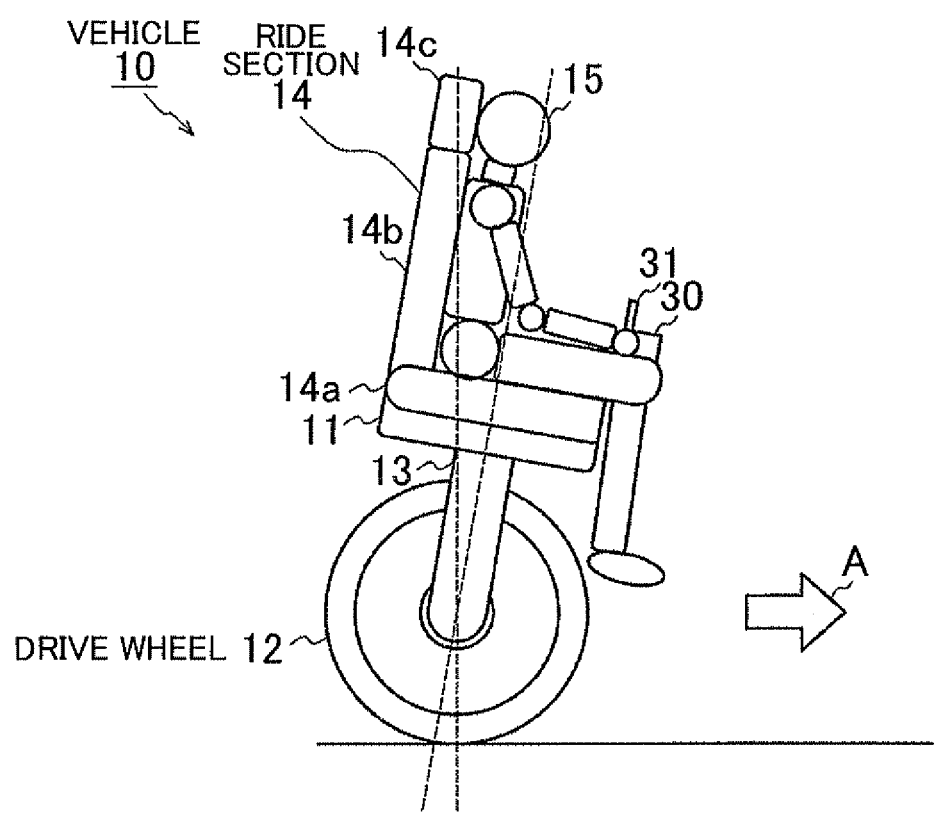
FIG. 1 is a schematic diagram showing a configuration of a vehicle according to a first embodiment of the present invention, showing a state in which the vehicle is accelerating forward with a passenger riding on the vehicle.
Figure 2:
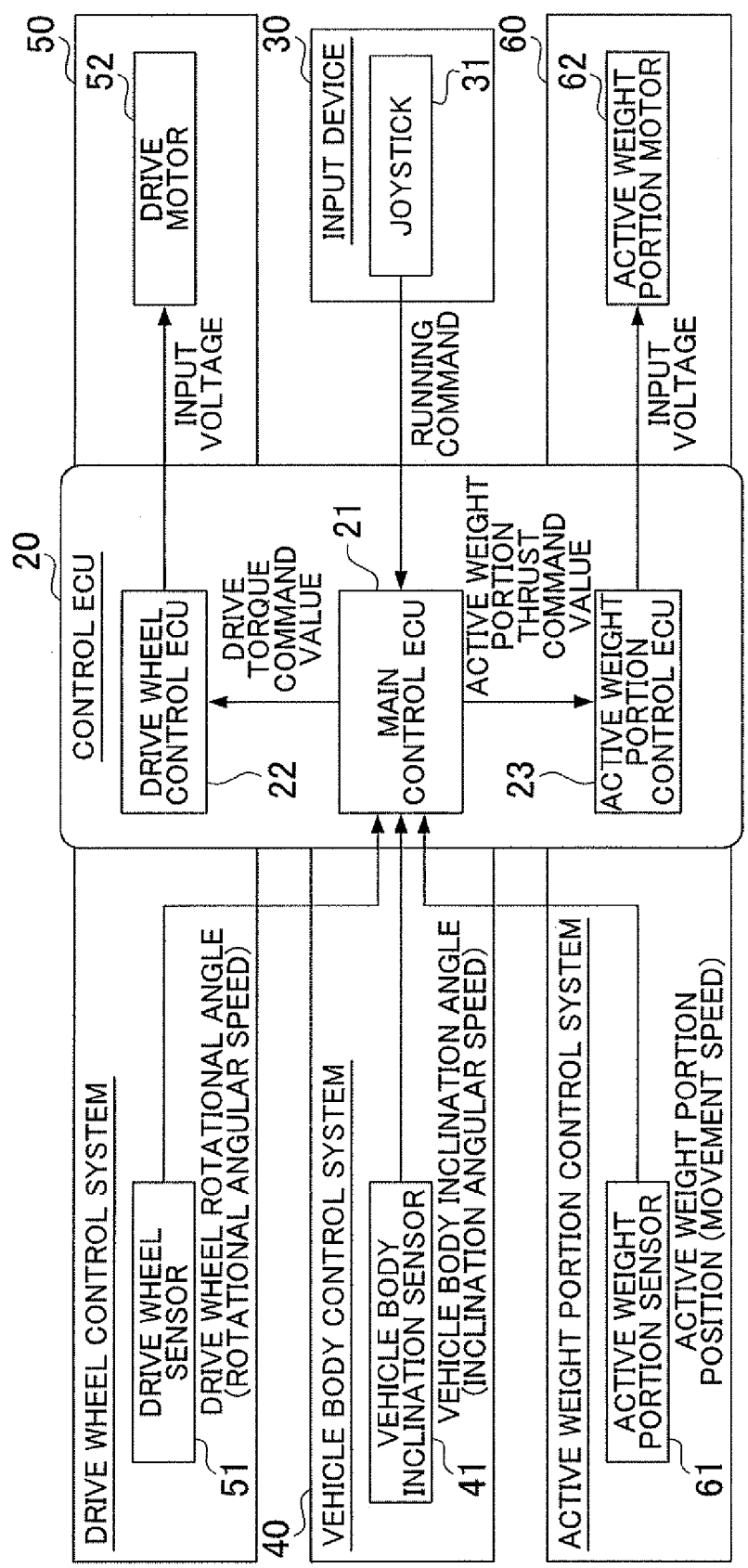
FIG. 2 is a block diagram showing a configuration of a control system for the vehicle according to the first embodiment of the present invention.

FIG. 1 is a schematic diagram showing a configuration of a vehicle according to a first embodiment of the present invention, showing a state in which the vehicle is accelerating forward with a passenger riding on the vehicle. FIG. 2 is a block diagram showing a configuration of a control system for the vehicle according to the first embodiment of the present invention.

In the drawings, reference numeral 10 denotes a vehicle according to this embodiment. The vehicle 10 includes a main body portion 11 of a vehicle body, drive wheels 12, a support portion 13, and a ride section 14 ridden by a passenger 15. The attitude of the vehicle body is controlled utilizing inverted-pendulum attitude control. The vehicle body of the vehicle 10 can be inclined forward and rearward. In the example shown in FIG. 1, the vehicle 10 is accelerating in the direction indicated by the arrow A with the vehicle body inclined forward in the advancing direction.

The drive wheels 12 are rotatably supported by the support portion 13 that is a part of the vehicle body, and are driven by drive motors 52 serving as drive actuators. The axis of the drive wheels 12 extends in the direction perpendicular to the drawing sheet of FIG. 1 and the drive wheels 12 rotate about the axis. Any number (single or multiple) of drive wheels 12 may be provided. In the case where a plurality of drive wheels 12 are provided, the drive wheels 12 are disposed in parallel on the same axis. Description will be made with the assumption that two drive wheels 12 are provided in the case of this embodiment. In this case, the drive wheels 12 are independently driven by separate drive motors 52. While a hydraulic motor or an internal combustion engine, for example, may be used as the drive actuator, description will be made with the assumption that the drive motors 52 that are electric motors are used in this embodiment.

The main body portion 11, which is a part of the vehicle body, is supported by the support portion 13 from below and positioned above the drive wheels 12. The ride section 14, which functions as an active weight portion, is attached to the main body portion 11 so as to be relatively translatable with respect to the main body portion 11 in the front-rear direction of the vehicle 10, in other words, so as to be relatively movable in the direction of a tangent to a circle representing rotation of the vehicle body.

The active weight portion has a certain mass, and is translated with respect to the main body portion 11, that is, moved forward and rearward, to actively correct the position of the center of gravity of the vehicle 10. The active weight portion is not necessarily the ride section 14, and may be a device formed by attaching a heavy peripheral device such as a battery to the main body portion 11 so as to be translatable, or may be a device formed by attaching a dedicated weight member such as a weight, a weight (omori) or a balancer to the main body portion 11 so as to be translatable, for example. The ride section 14, a heavy peripheral device, and a dedicated weight member may be used in combination.

While the ride section 14 ridden by the passenger 15 functions as an active weight portion in this embodiment for the convenience of description, the ride section 14 is not necessarily ridden by the passenger 15. For example, in the case where the vehicle 10 is manipulated by remote control, it is not necessary that the ride section 14 is ridden by the passenger 15 and a piece of freight may be placed on the ride section 14 in place of the passenger 15.

The ride section 14 is similar to a seat for use in automobiles such as passenger cars and buses. The ride section 14 includes a seat surface portion 14a, a backrest portion 14b, and a headrest 14c, and is attached to the main body portion 11 via a movement mechanism (not shown).

The movement mechanism includes a low-resistance linear movement mechanism such as a linear guide device, and an active weight portion motor 62 serving as an active weight portion actuator. The active weight portion motor 62 drives the ride section 14 to move the ride section 14 with respect to the main body portion 11 forward and rearward in the advancing direction. While a hydraulic motor or a linear motor, for example, may be used as the active weight portion actuator, description will be made with the assumption that the active weight portion motor 62 that is a rotary electric motor is used in this embodiment.

The linear guide device includes, for example, a guide rail attached to the main body portion 11, a carriage attached to the ride section 14 to slide along the guide rail, and rolling elements, such as balls and rollers, interposed between the guide rail and the carriage. The guide rail has two track grooves formed in left and right side surfaces to extend linearly along the longitudinal direction. The carriage is formed to have a U-shaped cross section, and has two track grooves formed in inner sides of two opposing side surfaces to respectively oppose the track grooves of the guide rail. The rolling elements are embedded between the track grooves to roll in the track grooves as the guide rail and the carriage move linearly with respect to each other. The carriage is formed to have a return passage that connects both ends of the track groove to allow the rolling elements to circulate through the track groove and the return passage.

The linear guide device also includes a brake or a clutch that locks movement of the linear guide device. When movement of the ride section 14 is not necessary, for example when the vehicle 10 is stationary, the brake is engaged to fix the carriage with respect to the guide rail in order to retain the relative positional relationship between the main body portion 11 and the ride section 14. When movement of the ride section 14 is necessary, the brake is disengaged to control the distance between the reference position of the main body portion 11 and the reference position of the ride section 14 to a predetermined value.

An input device 30 is disposed beside the ride section 14. The input device 30 includes a joystick 31 serving as a target running state acquisition device. The passenger 15 operates the joystick 31 to issue a running command for causing the vehicle 10 to accelerate, decelerate, make a turn, rotate on the spot, stop, brake, and so forth. In place of the joystick 31, another device, such as a jog dial, a touch panel, and a push button, that is operated by the passenger 15 to issue a running command may be used as the target running state acquisition device.

In the case where the vehicle 10 is manipulated by remote control, a reception device, in place of the joystick 31, that receives a running command from a controller via a wire or wirelessly may be used as the target running state acquisition device. In the case where the vehicle 10 runs automatically in accordance with running command data determined in advance, a data read device, in place of the joystick 31, that reads running command data stored in a storage medium such as a semiconductor memory or a hard disk may be used as the target running state acquisition device.

The vehicle 10 also includes a control ECU (Electronic Control Unit) 20 serving as a vehicle control device. The control ECU 20 includes a main control ECU 21, a drive wheel control ECU 22, and an active weight portion control ECU 23. Each of the control ECU 20 and the main control ECU 21, the drive wheel control ECU 22, and the active weight portion control ECU 23 is a computer system that includes a computation means such as a CPU or an MPU a storage means such as a magnetic disk or a semiconductor memory, an input/output interface, and so forth and that controls operation of respective portions of the vehicle 10. Such computer systems are disposed in the main body portion 11, for example, but may be disposed in the support portion 13 or the ride section 14. The main control ECU 21, the drive wheel control ECU 22, and the active weight portion control ECU 23 may be formed separately from or integrally with each other.

The main control ECU 21, together with the drive wheel control ECU 22, a drive wheel sensor 51, and the drive motors 52, functions as a part of a drive wheel control system 50 that controls operation of the drive wheels 12. The drive wheel sensor 51 includes a resolver, an encoder, etc., and functions as a drive wheel rotational state measurement device. The drive wheel sensor 51 detects a drive wheel rotational angle and/or a rotational angular speed that indicates the rotational state of the drive wheels 12 to transmit the detection results to the main control ECU 21. The main control ECU 21 transmits a drive torque command value to the drive wheel control ECU 22. The drive wheel control ECU 22 supplies the drive motors 52 with an input voltage that is equivalent to the received drive torque command value. The drive motors 52 provide a drive torque to the drive wheels 12 in accordance with the input voltage. The drive motors 52 thus function as drive actuators.

Also, the main control ECU 21, together with the active weight portion control ECU 23, an active weight portion sensor 61, and the active weight portion motor 62, functions as a part of an active weight portion control system 60 that controls operation of the ride section 14 serving as an active weight portion. The active weight portion sensor 61 includes an encoder etc., and functions as an active weight portion movement state measurement device. The active weight portion sensor 61 detects an active weight portion position and/or a movement speed that indicates the movement state of the ride section 14 to transmit the detection results to the main control ECU 21. The main control ECU 21 transmits an active weight portion thrust command value to the active weight portion control ECU 23. The active weight portion control ECU 23 supplies the active weight portion motor 62 with an input voltage that is equivalent to the received active weight portion thrust command value. The active weight portion motor 62 provides thrust for translating the ride section 14 in accordance with the input voltage. The active weight portion motor 62 thus functions as an active weight portion actuator.

Further, the main control ECU 21, together with the drive wheel control ECU 22, the active weight portion control ECU 23, a vehicle body inclination sensor 41, the drive motors 52, and the active weight portion motor 62, functions as a part of a vehicle body control system 40 that controls the attitude of the vehicle body. The vehicle body inclination sensor 41 includes an acceleration sensor, a gyro sensor, etc., and functions as a vehicle body inclination state measurement device. The vehicle body inclination sensor 41 detects a vehicle body inclination angle and/or an inclination angular speed that indicates the inclination state of the vehicle body to transmit the detection results to the main control ECU 21. The main control ECU 21 transmits the drive torque command value to the drive wheel control ECU 22, and transmits the active weight portion thrust command value to the active weight portion control ECU 23.

The main control ECU 21 receives the running command from the joystick 31 of the input device 30. The main control ECU 21 transmits the drive torque command value to the drive wheel control ECU 22, and transmits the active weight portion thrust command value to the active weight portion control ECU 23.

The control ECU 20 functions as a road surface gradient estimation means for estimating the road surface gradient on the basis of temporal changes in running state and vehicle body attitude of the vehicle 10. The control ECU 20 also functions as a target vehicle body attitude determination means for determining a vehicle body attitude to be targeted, that is, a vehicle body inclination state and/or an active weight portion movement state, in accordance with the target running state and the road surface gradient. The control ECU 20 further functions as an actuator output determination means for determining outputs of the respective actuators in accordance with the running state and the vehicle body attitude of the vehicle 10 acquired by the respective sensors, as well as the target running state, the target vehicle body attitude, and the road surface gradient. The control ECU 20 further functions as a road surface gradient acquisition means for acquiring the gradient of the surface of a road ahead of and behind the vehicle 10. The control ECU 20 further functions as a climbing torque determination means for determining a drive torque to be added in accordance with the road surface gradient. The control ECU 20 further functions as a center-of-gravity correction amount determination means for determining the correction amount for the center of gravity of the vehicle body in accordance with a climbing torque.

The respective sensors may be configured to acquire a plurality of state quantities. For example, an acceleration sensor and a gyro sensor may be used in combination as the vehicle body inclination sensor 41 to determine a vehicle body inclination angle and an inclination angular speed on the basis of measurement values of both the sensors.

Next, the operation of the vehicle 10 configured as described above will be described. First, an outline of a running and attitude control process is described.

Figure 3A:
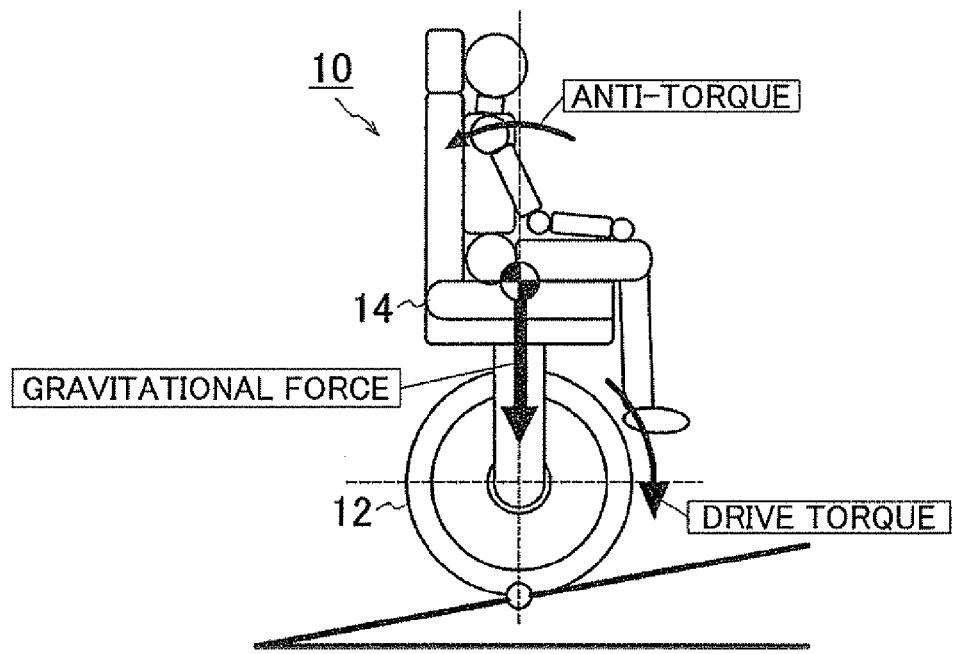
FIG. 3 is a schematic diagram showing an operation of the vehicle according to the first embodiment of the present invention on a slope.
Figure 3B:
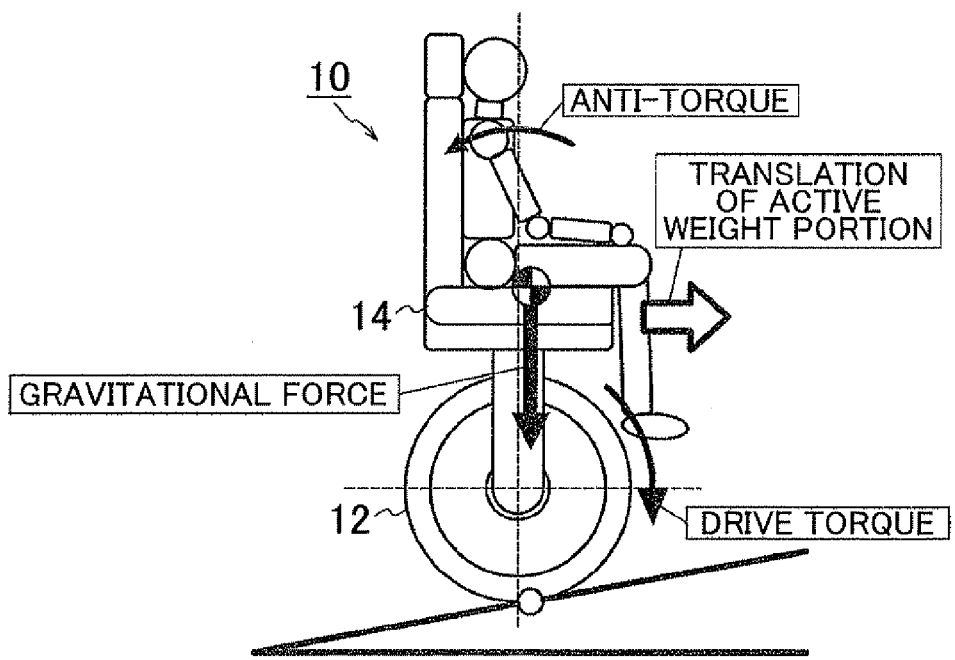
Figure 4:
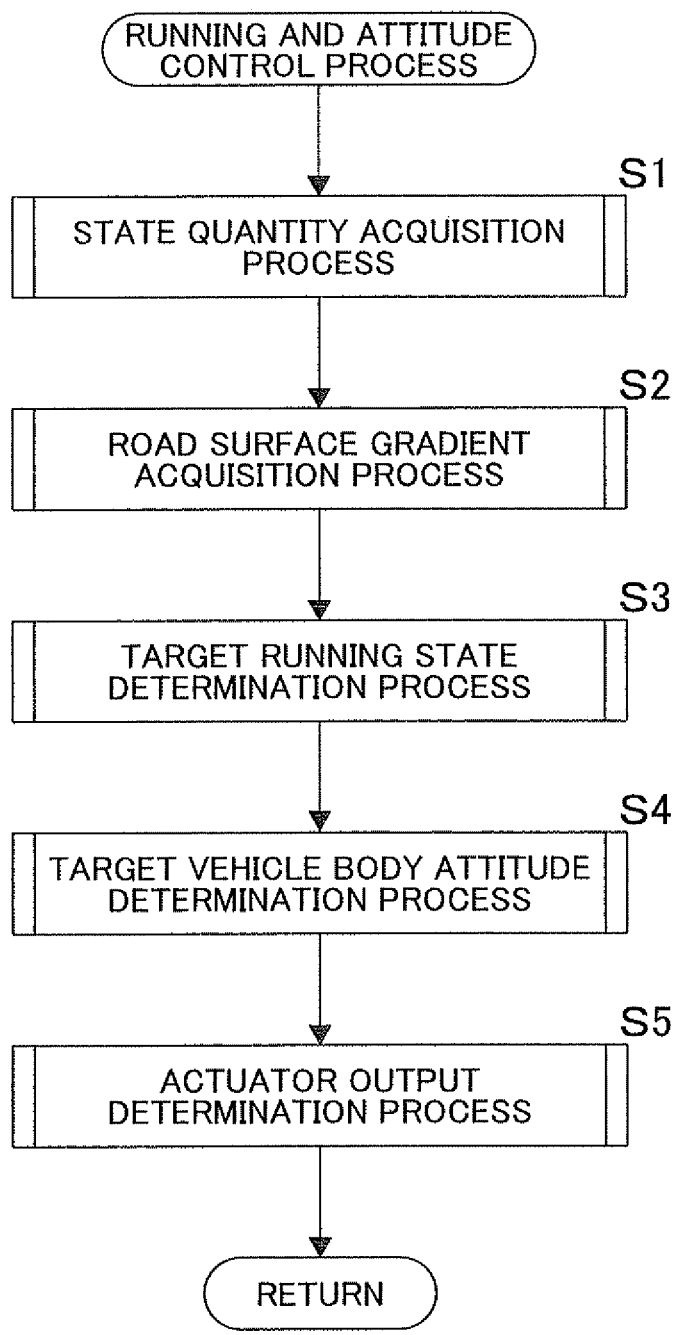
FIG. 4 is a flowchart showing the procedures of a running and attitude control process for the vehicle according to the first embodiment of the present invention.

FIG. 3 is a schematic diagram showing the operation of the vehicle according to the first embodiment of the present invention on a slope. FIG. 4 is a flowchart showing the procedures of the running and attitude control process for the vehicle according to the first embodiment of the present invention. FIG. 3A shows exemplary operation according to the related art for comparison. FIG. 3B shows operation according to this embodiment.

In this embodiment, the ride section 14 functions as an active weight portion, and is translated, that is, moved forward and rearward, to actively correct the position of the center of gravity of the vehicle 10 as shown in FIG. 3B. Consequently, the vehicle body is prevented from being inclined in the downslope direction even when a drive torque is provided to the drive wheels 12 in order to keep the vehicle 10 stationary on a slope, that is, to prevent the vehicle 10 from moving in the downslope direction, and an anti-torque that is the reaction of the drive torque is applied to the vehicle body. In the case where the vehicle 10 runs on a slope, in addition, the vehicle body is prevented from being inclined in the downslope direction, which allows stable running.

In the case where the position of the center of gravity is not corrected in accordance with the road surface gradient as in the vehicles according to the related art described in the "BACKGROUND ART" section, in contrast, the vehicle body is inclined in the downslope direction with the reaction of a drive torque provided to the drive wheels 12 in order to keep the vehicle 10 stationary on a slope, that is, an anti-torque, applied to the vehicle body as shown in FIG. 3A. In the case where the vehicle 10 runs on a slope, in addition, stable running and vehicle body attitude control cannot be performed.

In this embodiment, thus, the running and attitude control process is executed to allow the vehicle 10 to stably run and stop irrespective of the gradient of the road surface.

In the running and attitude control process, the control ECU 20 first executes a state quantity acquisition process (step S1) to acquire the rotational state of the drive wheels 12, the inclination state of the vehicle body, and the movement state of the ride section 14 using the respective sensors, that is, the drive wheel sensor 51, the vehicle body inclination sensor 41, and the active weight portion sensor 61.

The control ECU 20 then executes a road surface gradient acquisition process (step S2) to estimate a road surface gradient using an observer on the basis of the state quantities acquired in the state quantity acquisition process, that is, the rotational state of the drive wheels 12, the inclination state of the vehicle body, and the movement state of the ride section 14, and output values of the respective actuators, that is output values of the drive motors 52 and the active weight portion motor 62. The observer is a means for observing the internal state of a control system on the basis of a dynamic model, and is implemented by wired logic or soft logic.

The control ECU 20 then executes a target running state determination process (step S3) to determine a target value of the acceleration of the vehicle 10 and a target value of the rotational angular speed of the drive wheels 12 on the basis of the amount of operation of the joystick 31.

The control ECU 20 then executes a target vehicle body attitude determination process (step S4) to determine a target value of the vehicle body attitude, that is, a target value of the vehicle body inclination angle and a target value of the active weight portion position, on the basis of the road surface gradient acquired in the road surface gradient acquisition process and the target value of the acceleration of the vehicle 10 determined in the target running state determination process.

The control ECU 20 finally executes an actuator output determination process (step S5) to determine outputs of the respective actuators, that is, respective outputs of the drive motors 52 and the active weight portion motor 62, on the basis of the respective state quantities acquired in the state quantity acquisition process, the road surface gradient acquired in the road surface gradient acquisition process, the target running state determined in the target running state determination process, and the target vehicle body attitude determined in the target vehicle body attitude determination process.

Next, the running and attitude control process will be described in detail. The state quantity acquisition process is first described.

Figure 5:
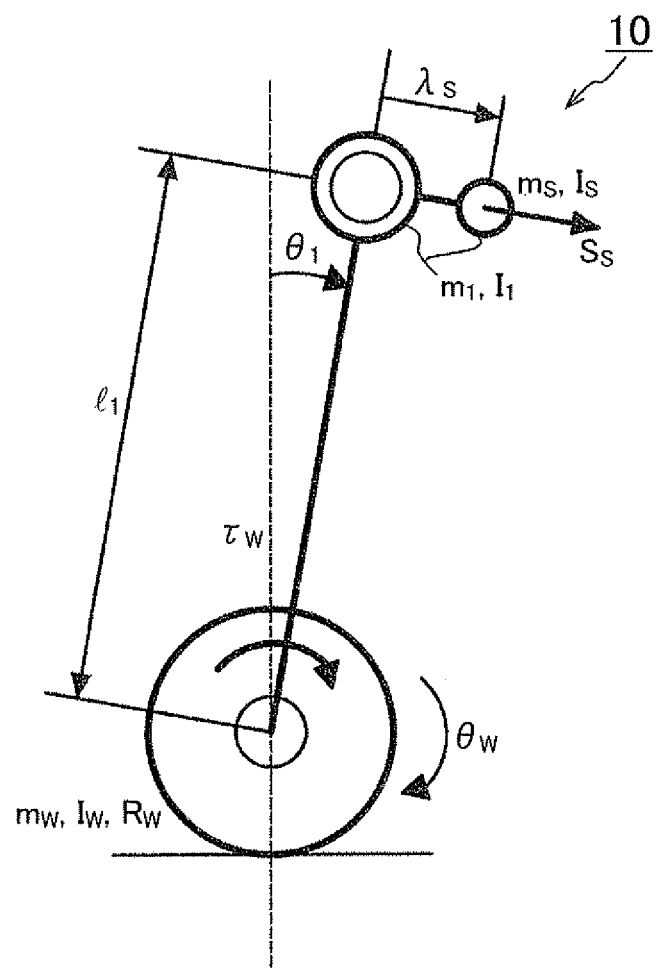
FIG. 5 illustrates a dynamic model of the vehicle according to the first embodiment of the present invention and parameters of the dynamic model.
Figure 6:
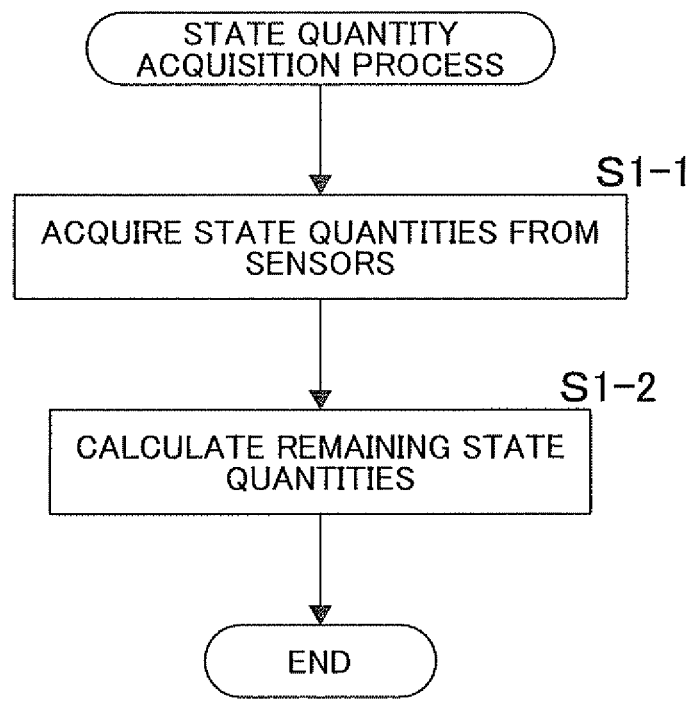
FIG. 6 is a flowchart showing the procedures of a state quantity acquisition process according to the first embodiment of the present invention.

FIG. 5 illustrates a dynamic model of the vehicle according to the first embodiment of the present invention and parameters of the dynamic model. FIG. 6 is a flowchart showing the procedures of the state quantity acquisition process according to the first embodiment of the present invention.

The state quantities and the parameters used in this embodiment are represented by the following symbols. Part of the state quantities and the parameters are shown in FIG. 5.

| | |
|---|---|
| $\theta_W$ | Drive wheel rotational angle (rad) |
| $\theta_1$ | Vehicle body inclination angle (with reference to the plumb line) (rad) |
| $\lambda_S$ | Active weight portion position (with reference to the vehicle body center) (m) |
| $\tau_W$ | Drive torque (sum for the two drive wheels) (Nm) |
| $S_S$ | Active weight portion thrust (N) |
| $g$ | Gravitational acceleration (m/s$^2$) |
| $\eta$ | Road surface gradient (rad) |
| $m_W$ | Mass of the drive wheels (sum for the two drive wheels) (kg) |
| $R_W$ | Drive wheel ground contact radius (m) |
| $I_W$ | Moment of inertia of the drive wheels (sum for the two drive wheels) (kgm$^2$) |
| $D_W$ | Viscous damping coefficient with respect to rotation of the drive wheels (Nms/rad) |
| $m_1$ | Mass of the vehicle body (including the active weight portion) (kg) |
| $l_1$ | Distance to the center of gravity of the vehicle body (from the axle) (m) |
| $I_1$ | Moment of inertia of the vehicle body (around the center of gravity) (kgm$^2$) |
| $D_1$ | Viscous damping coefficient with respect to inclination of the vehicle body (Nms/rad) |
| $m_S$ | Mass of the active weight portion (kg) |
| $l_S$ | Distance to the center of gravity of the active weight portion (from the axle) (m) |
| $I_S$ | Moment of inertia of the active weight portion (around the center of gravity) (kgm$^2$) |
| $D_S$ | Viscous damping coefficient with respect to translation of the active weight portion (Nms/rad) |

In the state quantity acquisition process, the main control ECU 21 first acquires state quantities from the sensors (step S1-1). In this step, the main control ECU 21 acquires the drive wheel rotational angle $\theta_W$ and/or the rotational angular speed $\dot{\theta}_W$ from the drive wheel sensor 51, the vehicle body inclination angle $\theta_1$ and/or the inclination angular speed $\dot{\theta}_1$ from the vehicle body inclination sensor 41, and the active weight portion position $\lambda_S$ and/or the movement speed $\dot{\lambda}_S$ from the active weight portion sensor 61.

The main control ECU 21 subsequently calculates the remaining state quantities (step S1-2). In this step, the acquired state quantities are differentiated or integrated with respect to time to calculate the remaining state quantities. In the case where the state quantities that have been acquired are the drive wheel rotational angle $\theta_W$, the vehicle body inclination angle $\theta_1$, and the active weight portion position $\lambda_S$, for example, the rotational angular speed $\dot{\theta}_W$, the inclination angular speed $\dot{\theta}_1$, and the movement speed $\dot{\lambda}_S$ are obtained by differentiating such state quantities with respect to the time. Also, in the case where the state quantities that have been acquired are the rotational angular speed $\dot{\theta}_W$, the inclination angular speed $\dot{\theta}_1$, and the movement speed $\dot{\lambda}_S$, for example, the drive wheel rotational angle $\theta_W$, the vehicle body inclination angle $\theta_1$, and the active weight portion position $\lambda_S$ are obtained by integrating such state quantities with respect to the time.

Next, the road surface gradient acquisition process will be described.

Figure 7:
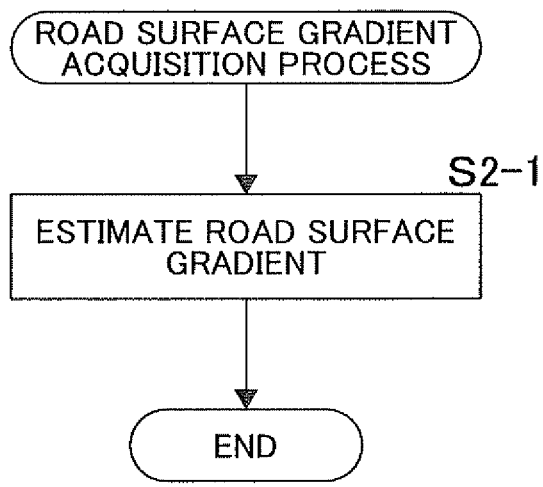
FIG. 7 is a flowchart showing the procedures of a road surface gradient acquisition process according to the first embodiment of the present invention.

FIG. 7 is a flowchart showing the procedures of the road surface gradient acquisition process according to the first embodiment of the present invention.

In the road surface gradient acquisition process, the main control ECU 21 estimates a road surface gradient η (step S2-1). In this step, the road surface gradient η is estimated on the basis of state quantities acquired in the state quantity acquisition process and each actuator output determined in the actuator output determination process in the preceding running and attitude control process (one cycle earlier) using Formula 1 below.

(Expression 1)

$$\eta = \frac{1}{Mg}\left\{\frac{\tau_W}{R_W} - (\tilde{M}R_W\ddot{\theta}_W + m_1 l_1 \ddot{\theta}_1 + m_S \ddot{\lambda}_S)\right\} \quad \text{Formula 1}$$

In this formula, $M = m_1 + m_W$ and $$\tilde{M} = M + \frac{I_W}{R_W^2}.$$

The accelerations $\ddot{\theta}_W$, $\ddot{\theta}_1$, and $\ddot{\lambda}_S$ are obtained by differentiating the rotational angular speed $\dot{\theta}_W$, the inclination angular speed $\dot{\theta}_1$, and the movement speed $\dot{\lambda}_S$ with respect to the time.

In Formula 1, a value obtained by multiplying the left-hand side by the denominator of the right-hand side, that is, Mgη, represents an external force.

$$\frac{\tau_W}{R_W}$$

represents a drive force, and $(\tilde{M}R_W\ddot{\theta}_W + m_1 l_1 \ddot{\theta}_1 + m_S \ddot{\lambda}_S)$ represents an inertial force.

$\tilde{M}R_W\ddot{\theta}_W$ represents a drive wheel translation inertial force, $m_1 l_1 \ddot{\theta}_1$ represents a vehicle body inclination inertial force, and $m_S \ddot{\lambda}_S$ represents an active weight portion movement inertial force.

In this embodiment, as described above, the road surface gradient is estimated on the basis of the drive torque output by the drive motors 52 and the drive wheel rotational angular acceleration, the vehicle body inclination angular acceleration, and the active weight portion movement acceleration that are the state quantities. In this case, not only the drive wheel rotational angular acceleration that indicates the rotational state of the drive wheels 12 but also the vehicle body inclination angular acceleration and the active weight portion movement acceleration that indicate changes in attitude of the vehicle body are considered. That is, consideration is given to changes in attitude of the vehicle body, which is an element typical of so-called inverted-pendulum vehicles that utilize inverted-pendulum attitude control.

In the related art, the road surface gradient is estimated on the basis of the drive torque and the drive wheel rotational angular acceleration. Therefore, a large error may be produced in the estimated value of the road surface gradient especially when the attitude of the vehicle body is changing. In this embodiment, however, the road surface gradient is estimated in consideration of the vehicle body inclination angular acceleration and the active weight portion movement acceleration that indicate changes in attitude of the vehicle body as well. Therefore, the road surface gradient can be estimated with extremely high precision without the possibility of a large error.

In inverted-pendulum vehicles, in general, the center of gravity of the vehicle body relatively moves forward and rearward with respect to the drive wheels. Thus, the center of gravity of the vehicle occasionally moves forward and rearward even when the drive wheels are stationary. Thus, it is necessary to consider the influence of such movement of the center of gravity in order to estimate the road surface gradient with high precision on the basis of the acceleration of the center of gravity and the drive force or the drive torque. In general inverted-pendulum vehicles, the weight ratio of the vehicle body to the entire vehicle is high, and thus the influence of such movement of the center of gravity is significant especially when the vehicle is stationary.

A low-pass filter may be applied to the estimated value of the road surface gradient to remove high-frequency components of the estimated value. In this case, vibration due to the high-frequency components can be suppressed while a time delay occurs in the estimation.

In the embodiment, the drive force, the inertial force, and gravitational components associated with the road surface gradient are considered. However, the rolling resistance of the drive wheels 12, the viscous drag due to the friction of a rotary shaft, or the air resistance acting on the vehicle 10 may also be considered as secondary influences.

In the embodiment, a linear model for the rotational motion of the drive wheels 12 is used. However, a more accurate non-linear model or a model for the inclination motion of the vehicle body or for the translational motion of the active weight portion may also be used. In the case where a non-linear model is used, functions may be applied in the form of a map.

For the simplification of the calculation, the consideration of changes in vehicle body attitude may be omitted.

Next, the target running state determination process will be described.

Figure 8:
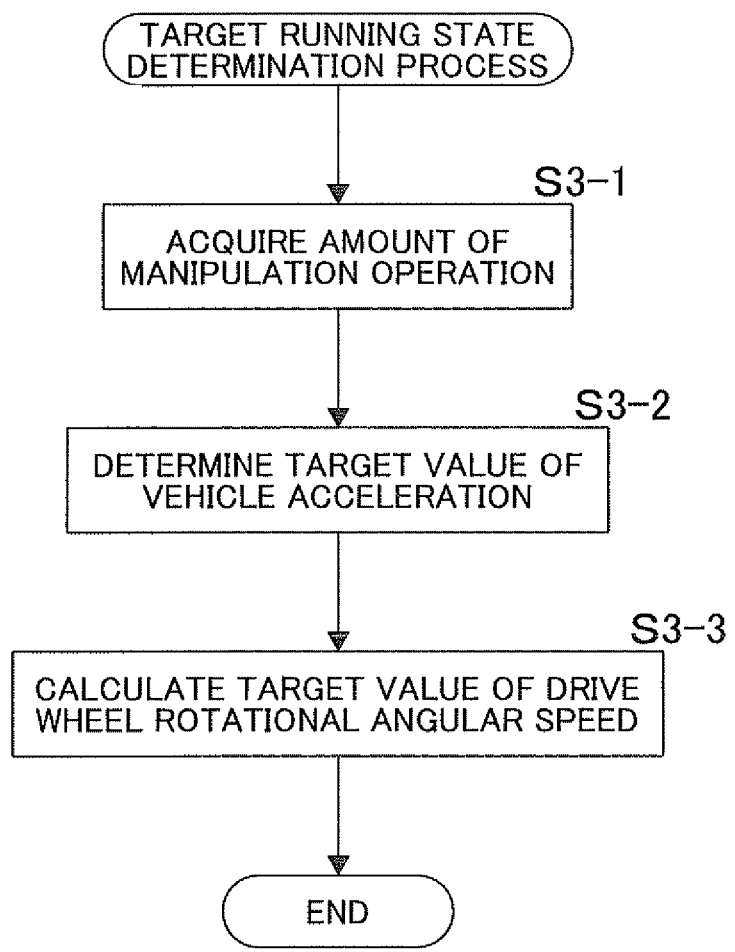
FIG. 8 is a flowchart showing the procedures of a target running state determination process according to the first embodiment of the present invention.

FIG. 8 is a flowchart showing the procedures of the target running state determination process according to the first embodiment of the present invention.

In the target running state determination process, the main control ECU 21 first acquires the amount of manipulation operation (step S3-1). In this step, the main control ECU 21 acquires the amount of operation of the joystick 31 performed by the passenger 15 to issue a running command for causing the vehicle 10 to accelerate, decelerate, make a turn, rotate on the spot, stop, brake, and so forth.

The main control ECU 21 subsequently determines a target value of the vehicle acceleration on the basis of the acquired amount of operation of the joystick 31 (step S3-2). For example, the target value of the vehicle acceleration is set to a value that is proportional to the amount of operation of the joystick 31 in the front-rear direction.

The main control ECU 21 subsequently calculates a target value of the drive wheel rotational angular speed from the determined target value of the vehicle acceleration (step S3-3). For example, the target value of the drive wheel rotational angular speed is set to a value obtained by integrating the target value of the vehicle acceleration with respect to the time and dividing the resulting value by the drive wheel ground contact radius $R_W$.

Next, the target vehicle body attitude determination process will be described.

Figure 9:
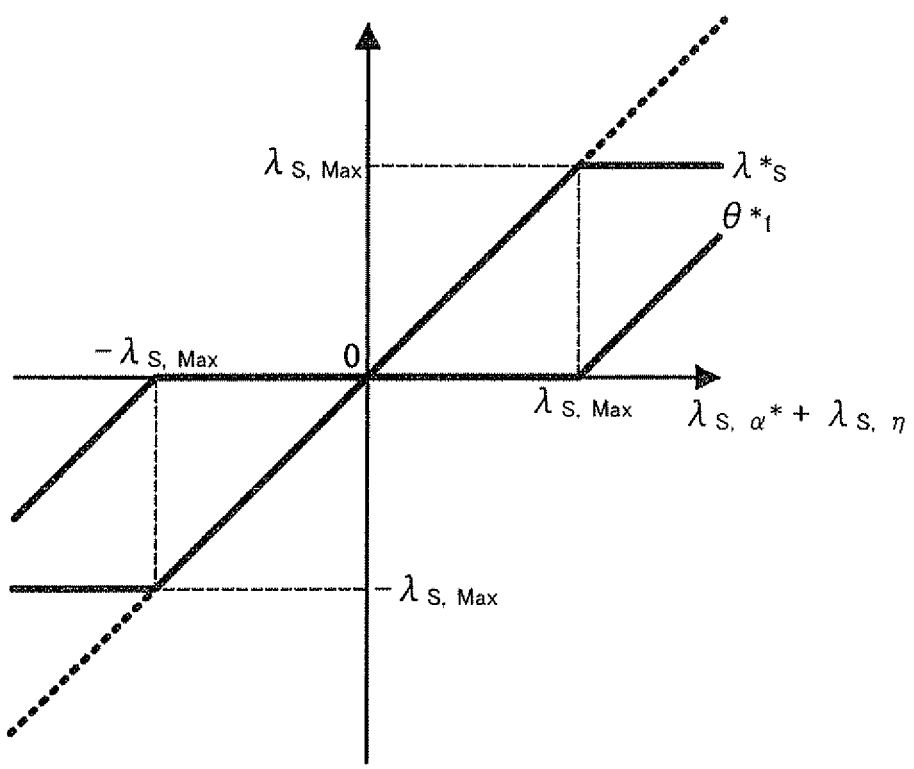
FIG. 9 is a graph showing changes in target value of an active weight portion position and changes in target value of a vehicle body inclination angle according to the first embodiment of the present invention.
Figure 10:
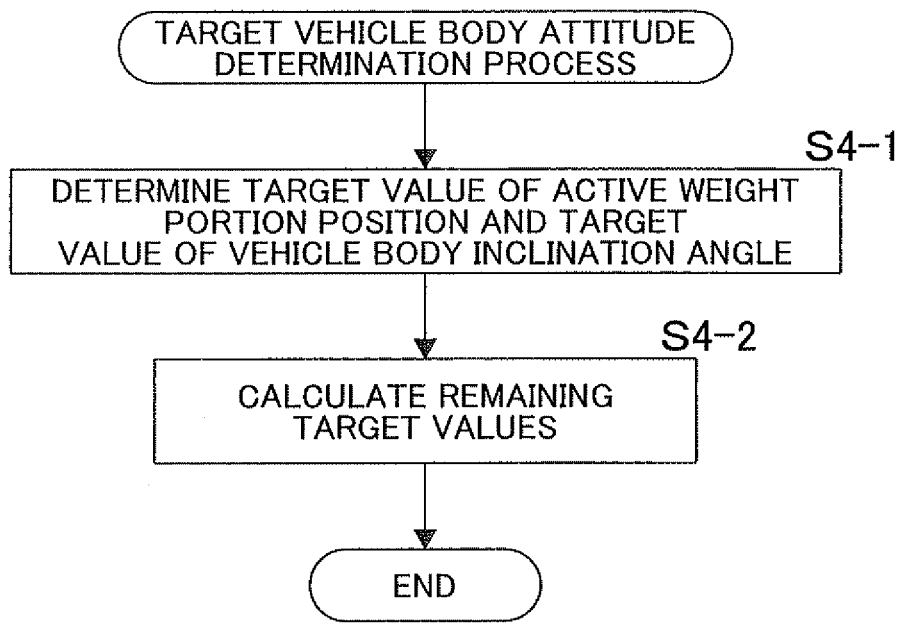
FIG. 10 is a flowchart showing the procedures of a target vehicle body attitude determination process according to the first embodiment of the present invention.

FIG. 9 is a graph showing changes in target value of the active weight portion position and changes in target value of the vehicle body inclination angle according to the first embodiment of the present invention. FIG. 10 is a flowchart showing the procedures of the target vehicle body attitude determination process according to the first embodiment of the present invention.

In the target vehicle body attitude determination process, the main control ECU 21 first determines a target value of the active weight portion position and a target value of the vehicle body inclination angle (step S4-1). In this step, the target value of the active weight portion position and the target value of the vehicle body inclination angle are determined on the basis of the target value of the vehicle acceleration determined in the target running state determination process and the road surface gradient η acquired in the road surface gradient acquisition process using Formulas 2 and 3 below.

(Expression 2)

When the target value of the vehicle acceleration is defined as $\alpha^*[G]$, the target value $\lambda_S^*$ of the active weight portion position is represented by Formula 2 below.

$$\lambda_S^* = \begin{cases} -\lambda_{S,Max} & (\lambda_{S,\alpha}^* + \lambda_{S,\eta} \leq -\lambda_{S,Max}) \\ \lambda_{S,\alpha}^* + \lambda_{S,\eta} & (-\lambda_{S,Max} < \lambda_{S,\alpha}^* + \lambda_{S,\eta} < \lambda_{S,Max}) \\ \lambda_{S,Max} & (\lambda_{S,\alpha}^* + \lambda_{S,\eta} \geq \lambda_{S,Max}) \end{cases} \quad \text{Formula 2}$$

In this formula, $$\lambda_{S,\alpha}^* = \frac{m_1 l_1 + \tilde{M} R_W}{m_S} \alpha^* \text{ and } \lambda_{S,\eta} = \frac{M R_W}{m_S} \eta.$$

$\lambda_{S,Max}$ is an active weight portion movement limit, which is set in advance in accordance with the structure of the movement mechanism that moves the ride section 14 serving as the active weight portion.

$\lambda_{S,\alpha}^*$ is an active weight portion movement amount that is necessary to balance the vehicle body against the inertial force due to the vehicle acceleration and the drive motor anti-torque, that is, an amount of movement that offsets the influence of the acceleration and deceleration of the vehicle 10.

On the other hand, $\lambda_{S,\eta}$ is an active weight portion movement amount that is necessary to balance the vehicle body against the anti-torque associated with the climbing torque according to the road surface gradient η, that is, an amount of movement that offsets the influence of the road surface gradient η.

(Expression 3)

The target value $\theta_l^*$ of the vehicle body inclination angle is represented by Formula 3 below.

$$\theta_l^* = \begin{cases} \theta_{1,\alpha}^* + \theta_{1,\eta} + \theta_{S,Max} & (\lambda_{S,\alpha}^* + \lambda_{S,\eta} \leq -\lambda_{S,Max}) \\ 0 & (-\lambda_{S,Max} < \lambda_{S,\alpha}^* + \lambda_{S,\eta} < \lambda_{S,Max}) \\ \theta_{1,\alpha}^* + \theta_{1,\eta} - \theta_{S,Max} & (\lambda_{S,\alpha}^* + \lambda_{S,\eta} \geq \lambda_{S,Max}) \end{cases} \quad \text{Formula 3}$$

In this formula, $$\theta_{1,\alpha}^* = \frac{m_1 l_1 + \tilde{M} R_W}{m_1 l_1} \alpha^*, \quad \theta_{1,\eta} = \frac{M R_W}{m_1 l_1} \eta, \text{ and}$$

$$\theta_{S,Max} = \frac{m_S \lambda_{S,Max}}{m_1 l_1}.$$

$\theta_{S,Max}$ is a value obtained by converting the effect of moving the ride section 14 serving as the active weight portion to the active weight portion movement limit $\lambda_{S,Max}$ into the vehicle body inclination angle, for subtraction of the amount of the movement of the ride section 14.

$\theta_{l,\alpha}^*$ is a vehicle body inclination angle that is necessary to balance the vehicle body against the inertial force due to the vehicle acceleration and the drive motor anti-torque, that is, an inclination angle that offsets the influence of the acceleration and deceleration of the vehicle 10.

On the other hand, $\theta_{l,\eta}$ is a vehicle body inclination angle that is necessary to balance the vehicle body against the anti-torque associated with the climbing torque according to the road surface gradient η, that is, an inclination angle that offsets the influence of the road surface gradient η.

The main control ECU 21 subsequently calculates the remaining target values (step S4-2). That is, each target value is differentiated or integrated with respect to the time to calculate respective target values of the drive wheel rotational angle, the vehicle body inclination angular speed, and the active weight portion movement speed.

In this embodiment, as described above, the target value of the vehicle body attitude, that is, the target value of the active weight portion position and the target value of the vehicle body inclination angle, is determined in consideration of not only the inertial force acting on the vehicle body due to the vehicle acceleration and the drive motor anti-torque but also the anti-torque acting on the vehicle body and associated with the climbing torque according to the road surface gradient η.

In this event, the center of gravity of the vehicle body is moved so as to offset a torque acting on the vehicle body to incline the vehicle body, that is, a vehicle body inclination torque, using the action of the gravitational force. For example, when the vehicle 10 accelerates or climbs up a slope, the ride section 14 is moved forward, and further the vehicle body is inclined forward. Meanwhile, when the vehicle 10 decelerates or climbs down a slope, the ride section 14 is moved rearward, and further the vehicle body is inclined rearward.

In this embodiment, as shown in FIG. 9, the ride section 14 is first moved without inclining the vehicle body. When the ride section 14 reaches the active weight portion movement limit, the vehicle body starts being inclined. Therefore, the vehicle body is not inclined forward or rearward during small acceleration or deceleration, which provides the passenger 15 with improved ride comfort. The vehicle body is maintained upright even on a slope unless the slope is exceptionally steep, which makes it easy for the passenger 15 to secure the visibility. The vehicle body is not inclined significantly even on a slope unless the slope is exceptionally steep, which prevents the vehicle body from partly contacting the road surface.

In this embodiment, it is assumed that a forward active weight portion movement limit and a rearward active weight portion movement limit are equal to each other. However, when the forward active weight portion movement limit and the rearward active weight portion movement limit are different from each other, the inclination of the vehicle body may be performed in accordance with the respective limits. For example, in the case where the braking performance is set to be higher than the acceleration performance, it is necessary to set the rearward active weight portion movement limit to be farther than the forward active weight portion movement limit.

When the acceleration is low or the gradient is low, the vehicle body inclination torque is canceled by only moving the ride section 14 in this embodiment. However, a part or all of the vehicle inclination torque may be canceled by inclining the vehicle body. Inclining the vehicle body can reduce a force in the front-rear direction acting on the passenger 15.

In this embodiment, formulas based on a linearized dynamic model are used. However, formulas based on a more accurate non-linear model or a model with consideration of the viscous drag may also be used. In the case where non-linear formulas are used, functions may be applied in the form of a map.

Next, the actuator output determination process will be described.

Figure 11:
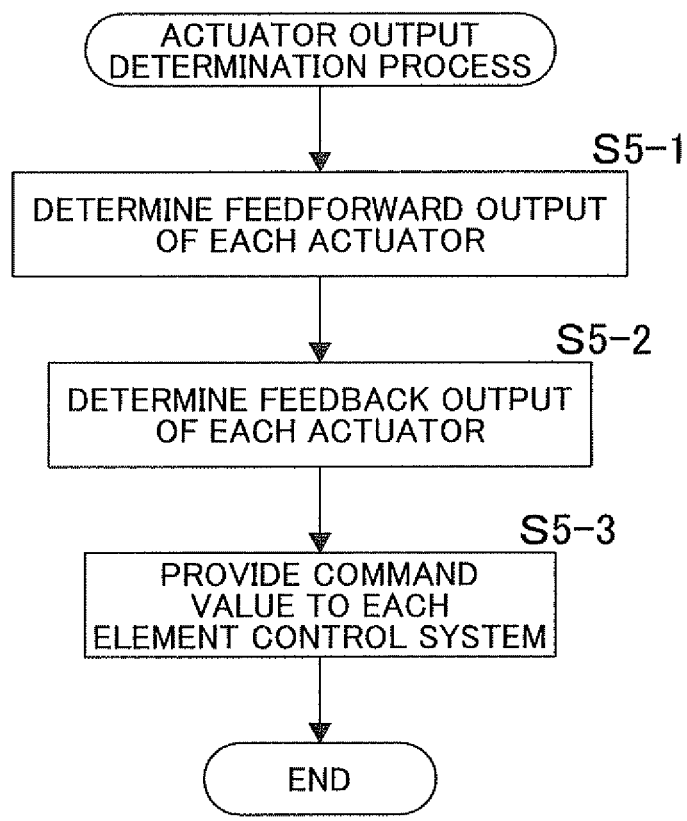
FIG. 11 is a flowchart showing the procedures of an actuator output determination process according to the first embodiment of the present invention.

FIG. 11 is a flowchart showing the procedures of the actuator output determination process according to the first embodiment of the present invention.

In the actuator output determination process, the main control ECU 21 first determines a feedforward output of each actuator (step S5-1). In this step, a feedforward output of the drive motors 52 is determined from each target value and the road surface gradient η using Formula 4 to be discussed later, and a feedforward output of the active weight portion motor 62 is determined using Formula 5 to be discussed later.

(Expression 4)

The feedforward output $\tau_{W,FF}$ of the drive motors 52 is represented by Formula 4 below.

$$\tau_{W,FF} = \tilde{MR}_W g \alpha^* + MR_W g \eta \qquad \text{Formula 4}$$

$\tilde{MR}_W g \alpha^*$ represents a drive torque that is necessary to achieve a target value $\alpha^*$ of the vehicle acceleration. $MR_W g \eta$ represents a drive torque for allowing the vehicle to be stationary on a slope with the road surface gradient η, that is, the climbing torque.

By automatically adding the climbing torque according to the road surface gradient η, that is, correcting the drive torque in accordance with the road surface gradient η as described above, the same manipulation feel as on a level ground can be provided on a slope. That is, the vehicle 10 does not move if the passenger 15 releases the joystick 31 after the vehicle 10 becomes stationary on a slope. Moreover, the vehicle 10 can also accelerate and decelerate on a slope in the same way as on a level ground in response to a specific manipulation operation of the joystick 31.

(Expression 5)

The feedforward output $S_{S,FF}$ of the active weight portion motor 62 is represented by Formula 5 below.

$$S_{S,FF} = m_S g \theta_l^* + m_S g \alpha^* \qquad \text{Formula 5}$$

$m_S g \theta_l^*$ represents a ride section thrust that is required to keep the ride section 14 at the target position for the target value $\theta_l^*$ of the vehicle body inclination angle. $m_S g \alpha^*$ represents a ride section thrust that is required to keep the ride section 14 at the target position for the inertial force associated with the target value $\alpha^*$ of the vehicle acceleration.

In the embodiment, as described above, the feedforward outputs are provided theoretically to achieve control with higher precision.

The feedforward outputs may be omitted as necessary. In this case, values with a steady-state deviation and close to the feedforward outputs are indirectly provided by feedback control. It is possible to reduce the steady-state deviation by using an integral gain.

The main control ECU 21 subsequently determines a feedback output of each actuator (step S5-2). In this step, a feedback output of the drive motors 52 is determined from the deviation between each target value and the actual state quantity using Formula 6 to be discussed later, and a feedback output of the active weight portion motor 62 is determined using Formula 7 to be discussed later.

(Expression 6)

The feedback output $\tau_{W,FB}$ of the drive motors 52 is represented by Formula 6 below.

$$\tau_{W,FB} = -K_{W1}(\theta_W - \theta_W^*) - K_{W2}(\dot{\theta}_W - \dot{\theta}_W^*) - K_{W3}(\theta_l - \theta_l^*) - K_{W4}(\dot{\theta}_l - \dot{\theta}_l^*) - K_{W5}(\lambda_S - \lambda_S^*) - K_{W6}(\dot{\lambda}_S - \dot{\lambda}_S^*) \qquad \text{Formula 6}$$

$K_{W1}$ to $K_{W6}$ are each a feedback gain, which is set in advance to a value of an optimal regulator, for example. The symbol "*" indicates a target value.

The feedback output $S_{S,FB}$ of the active weight portion motor 62 is represented by Formula 7 below.

$$S_{S,FB} = -K_{S1}(\theta_W - \theta_W^*) - K_{S2}(\dot{\theta}_W - \dot{\theta}_W^*) - K_{S3}(\theta_l - \theta_l^*) - K_{S4}(\dot{\theta}_l - \dot{\theta}_l^*) - K_{S5}(\lambda_S - \lambda_S^*) - K_{S6}(\dot{\lambda}_S - \dot{\lambda}_S^*) \qquad \text{Formula 7}$$

$K_{S1}$ to $K_{S6}$ are each a feedback gain, which is set in advance to a value of an optimal regulator, for example. The symbol "*" indicates a target value.

Non-linear feedback control such as sliding mode control may also be introduced. Some of the feedback gains except $K_{W2}$, $K_{W3}$, and $K_{S5}$ may be set to zero for simpler control. An integral gain may be introduced to eliminate the steady-state deviation.

The main control ECU 21 finally provides a command value to each element control system (step S5-3). In this step, the main control ECU 21 transmits the sum of the feedforward output and the feedback output determined as discussed above to the drive wheel control ECU 22 and the active weight portion control ECU 23 as a drive torque command value and an active weight portion thrust command value.

In this embodiment, as described above, the road surface gradient η is estimated using an observer to provide a climbing torque and move the ride section 14 upslope. Therefore, the vehicle body can be retained to be upright on a slope, and even on a steep slope. A device that measures the road surface gradient η is not necessary, which simplifies the structure to reduce the cost.

Further, the vehicle body inclination angle $\theta_1$ and the active weight portion position $\lambda_S$ that indicate the attitude of the vehicle body are also taken into consideration in estimating the road surface gradient η. Therefore, the road surface gradient η can be estimated with extremely high precision without the possibility of a large error.

Next, a second embodiment of the present invention will be described. Components having the same structure as those of the first embodiment are given the same reference numerals and description thereof is omitted. Description of the operation and the effect that are the same as those of the first embodiment is also omitted.

Figure 12:
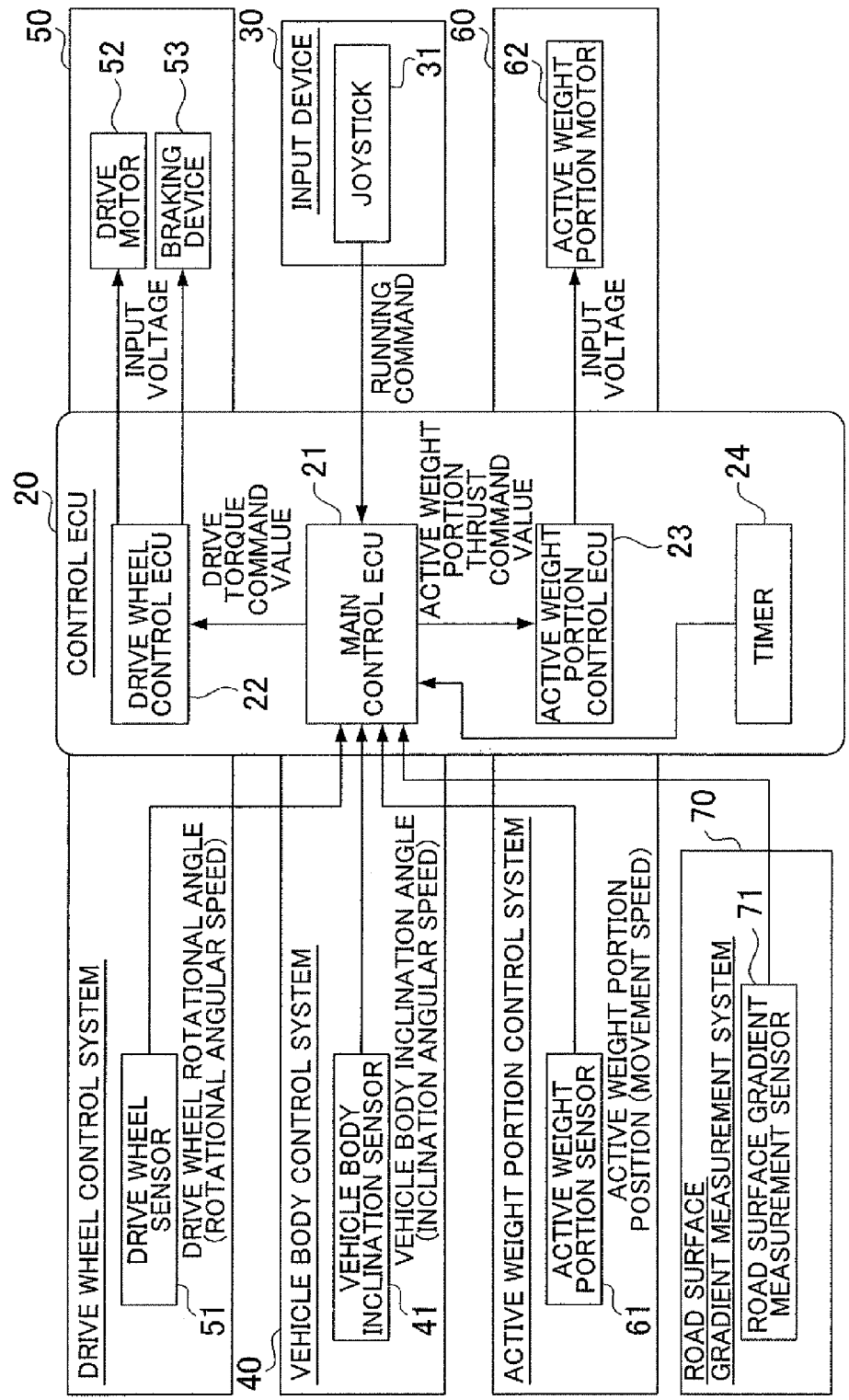
FIG. 12 is a block diagram showing a configuration of a control system for a vehicle according to a second embodiment of the present invention.

FIG. 12 is a block diagram showing the configuration of a control system for a vehicle according to a second embodiment of the present invention.

As described in relation to the first embodiment, in order to keep the vehicle 10 stationary on a slope, it is necessary to apply a drive torque to the drive wheels 12 so that the vehicle 10 does not move in the downslope direction. Therefore, the drive motors 52 continuously generate a drive torque while the vehicle 10 is maintained stationary on a slope. If the drive motors 52 continuously generate a drive torque with the drive wheels 12 stationary in order to keep the vehicle 10 stationary on a slope, however, the drive motors 52 consume energy even when the vehicle 10 is stationary, which lowers the energy efficiency.

Moreover, causing drive motors to continuously generate a large torque with the drive wheels stationary on a steep slope results in overuse of a part of a drive circuit in the drive motors, which may deteriorate or damage an element in the drive circuit.

In this embodiment, thus, when the vehicle 10 becomes stationary on a slope, the drive wheels 12 are prevented from rotating and balance of the vehicle body is kept to control the attitude of the vehicle body, by only moving the ride section 14 that functions as the active weight portion.

In order to maintain the attitude of the vehicle body when the vehicle 10 is stationary, it is considered, for example, to provide a stand like those provided to bicycles and motorcycles. However, a mechanism for automatically actuating a stand is heavy and expensive, and thus increases the weight and the cost of the vehicle 10. Moreover, in order to maintain the attitude of the vehicle body constant irrespective of the road surface gradient $\eta$, a mechanism for adjusting the length of a stand in accordance with the road surface gradient $\eta$ is required to further increase the cost.

Therefore, as shown in FIG. 12, the vehicle 10 includes a braking device 53 serving as a brake that brakes the drive wheels 12. The braking device 53 may be any type of device that can stop rotation of the drive wheels 12 with respect to the vehicle body, that is, lock the drive wheels 12 with respect to the vehicle body, and may be, for examples, an electromagnetic brake that brakes the drive wheels 12 electromagnetically or a friction brake that brakes the drive wheels 12 frictionally such as a drum brake and a disc brake. The braking device 53, together with the drive wheel control ECU 22, the drive wheel sensor 51, and the drive motors 52, functions as a part of a drive wheel control system 50 that controls operation of the drive wheels 12.

The vehicle 10 also includes a road surface gradient measurement system 70 that includes a road surface gradient measurement sensor 71. The road surface gradient measurement sensor 71 may include two distance sensors disposed on the lower surface of the ride section 14 and distanced from each other in the front-rear direction, for example, to calculate the road surface gradient $\eta$ on the basis of the difference between respective distances to the road surface measured by the two distance sensors distanced in the front-rear direction. The road surface gradient measurement sensor 71 may be any type of means that can acquire the road surface gradient $\eta$, and may be, for example, a sensor that determines the road surface gradient $\eta$ on the basis of image data acquired using a camera, a sensor that acquires road surface gradient data on the basis of a GPS (Global Positioning System) and map data, a laser range finder, or an observer that estimates the road surface gradient $\eta$ as in the first embodiment. The road surface gradient measurement sensor 71 transmits the acquired road surface gradient $\eta$ to the main control ECU 21.

The control ECU 20 further includes a timer 24 that counts the time. The timer 24 starts counting the time when the vehicle 10 becomes stationary on a slope, and stops counting the time when a predetermined time set in advance, for example 5 seconds, expires. The predetermined time is a threshold for braking the drive wheels 12. When the vehicle 10 is stationary on a slope for the predetermined time or more, the braking device 53 is actuated to stop rotation of the drive wheels 12. The timer 24 transmits an indication of the time expiration to the main control ECU 21.

Other components are the same in configuration as those in the first embodiment, and thus, description thereof is omitted.

Next, the operation of the vehicle 10 according to this embodiment will be described. Only the procedures of a slope stopping process performed when the vehicle is stationary on a slope are described. Other procedures are the same as those in the first embodiment, and thus, description thereof is omitted.

FIG. 13 is a flowchart showing the procedures of the slope stopping process for the vehicle according to the second embodiment of the present invention.

In the slope stopping process, the main control ECU 21 first determines whether or not the vehicle speed is zero (step S11). In this step, the main control ECU 21 determines the vehicle speed on the basis of the state quantities acquired in the state quantity acquisition process described in relation to the first embodiment. If the vehicle speed is not zero, the vehicle 10 is not stationary. Therefore, the process is terminated.

If the vehicle speed is zero, the vehicle 10 is stationary. Therefore, the main control ECU 21 determines whether or not the absolute value of the road surface gradient $\eta$ is more than a threshold (step S12). In this step, the main control ECU 21 determines whether or not the vehicle 10 is on a slope on the basis of whether or not the absolute value of the road surface gradient $\eta$ acquired from the road surface gradient measurement sensor 71 is more than a threshold set in advance. If the absolute value of the road surface gradient $\eta$ is not more than the threshold, it is considered that the vehicle 10 is stationary on a flat road rather than a slope. Thus, the process is terminated.

On the other hand, if the absolute value of the road surface gradient $\eta$ is more than the threshold, the vehicle 10 is stationary on a slope. Therefore, the main control ECU 21 determines whether or not the time has expired (step S13). In this step, the main control ECU 21 determines whether or not the vehicle 10 is continuously stationary on a slope for a predetermined time, for example 5 seconds, or more on the basis of whether or not an indication of time expiration has been received from the timer 24. If the time has not expired, it is determined that the vehicle 10 is not stationary on a slope for a sufficiently long time. Thus, it is determined whether or not the vehicle speed is zero again to repeat the subsequent procedures.

If the time has expired, the main control ECU 21 brakes the drive wheels 12 (step S14). In this step, the main control ECU 21 actuates the braking device 53 to stop rotation of the drive wheels 12, that is, lock the drive wheels 12, with respect to the vehicle body. Subsequently, the main control ECU 21 performs attitude control using only the active weight portion (step S15). In this step, a command value of the drive torque $\tau_W$, which is the output of the drive motors 52, is set to zero. Then, the active weight portion motor 62 is controlled by feedback of the vehicle body inclination angle, the inclination angular speed, the active weight portion position, and the movement speed.

(Expression 7)

The feedback output $S_B$ of the active weight portion motor 62 is represented by Formula 8 below.

$$S_B = -K'_{B3}(\theta_I - \theta_I^*) - K'_{B4}(\dot{\theta}_I - \dot{\theta}_I^*) - K'_{B5}(\lambda - \lambda^*) - K'_{B6}(\dot{\lambda} - \dot{\lambda}^*) \qquad \text{Formula 8}$$

$K'_{B3}$ to $K'_{B6}$ are each a feedback gain, which is set in advance to a value of an optimal regulator, for example. The symbol "*" indicates a target value.

The main control ECU 21 subsequently determines whether or not a braking operation is discontinued (step S16). In this step, the main control ECU 21 determines whether or not the passenger 15 has stopped inputting a command for braking on the basis of the acquired amount of operation of the joystick 31. If a braking operation is not discontinued, the main control ECU 21 determines whether or not an acceleration operation is performed (step S17). In this step, the main control ECU 21 determines whether or not the passenger 15 has input a command for acceleration on the basis of the acquired amount of operation of the joystick 31.

If an acceleration operation is performed, the main control ECU 21 cancels the braking of the drive wheels 12 (step S18). In this step, the main control ECU 21 actuates the braking device 53 to cancel the locking of the drive wheels 12.

After determining whether or not a braking operation is discontinued, if it is determined that a braking operation is discontinued, the main control ECU 21 immediately cancels the braking of the drive wheels 12 without determining whether or not an acceleration operation is performed. After determining whether or not an acceleration operation is performed, if it is determined that an acceleration operation is not performed, the main control ECU 21 continuously performs attitude control using only the active weight portion.

After actuating the braking device 53, the main control ECU 21 performs normal attitude control (step S19), and terminates the process. In the normal attitude control, the drive motors 52 and the active weight portion motor 62 are controlled by feedback of the vehicle body inclination angle, the inclination angular speed, the active weight portion position, and the movement speed.

(Expression 8)

The feedback output $\tau_W$ of the drive motors 52 is represented by Formula 9 below.

$$\tau_W = -K_{W1}(\theta_W - \theta_W^*) - K_{W2}(\dot{\theta}_W - \dot{\theta}_W^*) - K_{W3}(\theta_I - \theta_I^*) - K_{W4}(\dot{\theta}_I - \dot{\theta}_I^*) - K_{W5}(\lambda - \lambda^*) - K_{W6}(\dot{\lambda} - \dot{\lambda}^*) \qquad \text{Formula 9}$$

$K_{W1}$ to $K_{W6}$ are each a feedback gain, which is set in advance to a value of an optimal regulator, for example. The symbol "*" indicates a target value.

The feedback output $S_B$ of the active weight portion motor 62 is represented by Formula 10 below.

$$S_B = -K_{B1}(\theta_W - \theta_W^*) - K_{B2}(\dot{\theta}_W - \dot{\theta}_W^*) - K_{B3}(\theta_I - \theta_I^*) - K_{B4}(\dot{\theta}_I - \dot{\theta}_I^*) - K_{B5}(\lambda - \lambda^*) - K_{B6}(\dot{\lambda} - \dot{\lambda}^*) \qquad \text{Formula 10}$$

$K_{B1}$ to $K_{B6}$ are each a feedback gain, which is set in advance to a value of an optimal regulator, for example. The symbol "*" indicates a target value.

When compared to the feedback gains $K'_{B3}$ to $K'_{B6}$ in the case of the attitude control that uses only the active weight portion, the feedback gains desirably satisfy the relationship $K'_{B3} \geq K_{B3}$, $K'_{B4} \geq K_{B4}$, $K'_{B5} \geq K_{B5}$, $K'_{B6} \geq K_{B6}$.

In this embodiment, as described above, when the vehicle 10 becomes stationary on a slope, the drive wheels 12 are prevented from rotating and balance of the vehicle body is kept to control the attitude of the vehicle body, by only moving the ride section 14 that functions as the active weight portion. That is, the output of the drive motors 52 is brought to zero by performing attitude control using only the active weight portion with the drive wheels 12 locked. Therefore, the drive motors 52 do not consume energy, which improves the energy efficiency. Appropriate balance of the vehicle body can be kept and the vehicle can be kept stably stationary on a slope by moving the active weight portion.

The road surface gradient η is measured by the road surface gradient measurement sensor 71. Thus, no time delay occurs in the acquisition of the road surface gradient η. A device that is heavy and expensive such as a stand is not required, and thus the weight and the cost of the vehicle 10 are not increased.

When an external force acts on the vehicle body to introduce a disturbance during the attitude control that uses only the active weight portion, it is desirable to stop the attitude control that uses only the active weight portion and switch into the normal attitude control. For example, it can be determined that a disturbance has been introduced in the case where the vehicle body inclination angle and/or the inclination angular speed and/or the inclination angular acceleration are more than respective thresholds set in advance. A disturbance can be determined by a disturbance observer. The disturbance observer is a means for observing the internal state of a control system on the basis of a dynamic model. When the active weight portion diverges from its proper position, for example, a determination is made on the basis of the amount of the divergence.

In the description of procedures of the slope stopping process described above, the start conditions for starting the attitude control that uses only the active weight portion with the drive wheels 12 locked are that the absolute value of the road surface gradient η is more than a threshold and that the vehicle 10 is continuously stationary on a slope for a predetermined time or more. That is, description has been made of an example, in which, based on the result of determining whether or not the absolute value of the road surface gradient η is more than a threshold and whether or not the time has expired, the normal attitude control is stopped to switch into the attitude control that uses only the active weight portion. However, the starting condition may be one of the condition that the absolute value of the road surface gradient η is more than a threshold and the condition that the vehicle 10 is continuously stationary on a slope for a predetermined time or more.

In addition, a signal indicated by a traffic signal lamp provided at an intersection or the like ahead of the vehicle 10 may be recognized, and the start conditions may include the condition that the signal is a stop signal, that is, the signal is red. For example, image recognition may be performed on the basis of image data acquired by a camera to determine if the signal is red, or communication may be performed with the traffic signal lamp utilizing an ITS (Intelligent Transport System) to determine if the signal is red.

In the above description, the canceling conditions for canceling the attitude control that uses only the active weight portion with the drive wheels 12 locked are that a braking operation is discontinued and that an acceleration operation is performed. That is, description has been made of an example, in which, based on the result of determining whether or not a braking operation is discontinued and whether or not an acceleration operation is performed, the attitude control that uses only the active weight portion is stopped to switch into the normal attitude control. However, the canceling condition may be one of the condition that a braking operation is discontinued and the condition that an acceleration operation is performed.

A signal indicated by a traffic signal lamp provided at an intersection or the like ahead of the vehicle 10 may be recognized, and the start conditions may include the condition that the signal is a go signal, that is, the signal is green. For example, image recognition may be performed on the basis of image data acquired by a camera to determine if the signal is green, or communication may be performed with the traffic signal lamp utilizing an ITS to determine if the signal is green.

The start conditions may include the condition that the signal indicated by a traffic signal lamp for an intersecting road is red.

The present invention is not limited to the above embodiments and may be modified in various ways on the basis of the scope and spirit of the present invention, and such modifications are not excluded from the scope of the present invention.

The invention claimed is:

1. A vehicle that utilizes inverted-pendulum attitude control, the vehicle comprising:
   a drive wheel rotatably attached to a vehicle body;
   an active weight portion attached so as to be movable with respect to the vehicle body;
   a vehicle control device that controls an attitude of the vehicle body by controlling at least one of a drive torque applied to the drive wheel and a position of the active weight portion; and
   a timer that counts time, wherein
   the vehicle control device controls the attitude of the vehicle body by controlling only the position of the active weight portion when the vehicle is stationary on a slope, and
   the vehicle control device controls the attitude of the vehicle body by controlling only the position of the active weight portion when the timer counts a predetermined time or more with the vehicle stationary.

2. The vehicle according to claim 1, further comprising a road surface gradient estimation section that estimates a road surface gradient of the slope,
   wherein the vehicle control device controls the attitude of the vehicle body by controlling only the position of the active weight portion when the vehicle is stationary on the slope with the road surface gradient, estimated by the road surface gradient estimation section, that has an absolute value larger than a predetermined threshold.

3. The vehicle according to claim 1,
   wherein the vehicle control device controls the attitude of the vehicle body by controlling the drive torque applied to the drive wheel and the position of the active weight portion when a braking operation is discontinued or an acceleration operation is performed.

4. The vehicle according to claim 1, further comprising a braking device that brakes the drive wheel,
   wherein the vehicle control device actuates the braking device to brake the drive wheel when the vehicle is stationary.

5. The vehicle according to claim 4,
   wherein the vehicle control device cancels braking of the drive wheel performed by the braking device when a braking operation is discontinued or an acceleration operation is performed.

6. A vehicle that utilizes-pendulum attitude control, the vehicle comprising:
   a drive wheel rotatably attached to a vehicle body;
   an active weight portion attached so as to be movable with respect to the vehicle body;
   a vehicle control device that controls an attitude of the vehicle body by controlling a position of the active weight portion when the vehicle is stationary on a slope; and
   a timer that counts time, wherein
   the vehicle control device controls the attitude of the vehicle by controlling only the position of the active weight portion when the timer counts a predetermined time or more with the vehicle stationary.

* * * * *

UNITED STATES PATENT AND TRADEMARK OFFICE
CERTIFICATE OF CORRECTION

PATENT NO. : 8,504,282 B2  
APPLICATION NO. : 12/682736  
DATED : August 6, 2013  
INVENTOR(S) : Naoki Gorai Page 1 of 1

It is certified that error appears in the above-identified patent and that said Letters Patent is hereby corrected as shown below:

On the Title Page

Please amend the §371 (c)(1), (2), (4), date as follows:

Item (86), please change "June 6, 2010" to --June 16, 2010--.

Signed and Sealed this  
Fifteenth Day of October, 2013

Teresa Stanek Rea  
*Deputy Director of the United States Patent and Trademark Office*